United States Patent Office 2,783,269
Patented Feb. 26, 1957

---

2,783,269

STABILIZATION OF ACRYLONITRILE

Maurice Peter Bellis, Stamford, Conn., assignor to American Cyanamid Company, New York, N. Y., a corporation of Maine No Drawing. Application March 30, 1955, Serial No. 498,101

8 Claims. (Cl. 260—465.9)

This invention relates to the stabilization of acrylonitrile. More particularly, it relates to a method for inhibiting the polymerization of acrylonitrile and to the stabilized composition so obtained.

In the past few years, acrylonitrile has become increasingly important as a starting material in the manufacture of many products. For instance, it is of particular importance in the preparation of various plastics, artificial rubbers, synthetic fibers and the like.

In the manufacture of acrylonitrile, however, difficulty is frequently encountered in refining, shipment and storage due to its tendency to deteriorate and solidify. This may occur when heated to distillation temperature or when permitted to stand at normal temperatures. When acrylonitrile thus polymerizes and turns largely into a solid, it is obviously of no use for any of the various purposes noted above.

In the past, it has been proposed to add various materials to acrylonitrile as polymerization inhibitors. Generally, these were unsatisfactory for one or more of various reasons. Some, for instance, did not inhibit polymerization to any appreciable degree. Others required too large an amount to obtain required stabilization and/or were found to impart an objectionably dark color to the acrylonitrile. Still others were found to adversely affect the subsequent polymerization of acrylonitrile in preparation of polymers and copolymers.

It is an object of this invention to inhibit polymerization of acrylonitrile under normal temperature conditions during storage and shipment as well as under conditions of increased temperature during distillation. It is a further object of this invention to inhibit such polymerization through the addition of a relatively small amount of a material without producing an undesirable discoloration of the acrylonitrile. It is still a further object of this invention that polymerization be inhibited without, at the same time, rendering the acrylonitrile unsuited for subsequent use.

It has now been found, in accordance with this invention, that these objects may be met to a most surprising degree by incorporating in acrylonitrile an inhibiting amount of a 2,2'-methylene-bis-4-alkyl-6-tertiary butylphenol having the formula

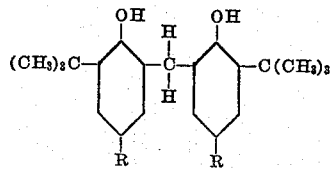

in which R is a lower alkyl radical, preferably methyl or ethyl.

By the addition of as little as 0.5 part per million, polymerization stability of acrylonitrile under temperature conditions of storage and shipment as well as at elevated temperatures may be substantially improved. Preferably, however, from about 10 to about 100 parts per million should be incorporated to obtain the most effective stabilization. Less than 10 parts per million usually does not provide stabilization to the desired extent. On the other hand, more than 100 parts per million does not sufficiently increase the extent of stabilization over that otherwise obtained to warrant the incorporation of a larger amount.

The inhibitors of this invention may be incorporated into acrylonitrile in any of various stages. For instance, such an inhibitor may be incorporated into crude acrylonitrile prior to purification by distillation or it may be introduced directly into the distillation column thereby preventing polymerization at the distillation temperature. On the other hand, it may be added to purified acrylonitrile prior to its being stored and shipped.

It is a further advantage of this invention that the inhibitors thereof may be simply and economically prepared from available materials. In general, this is accomplished by reacting a suitably alkylated cresol with formaldehyde and isolating the product.

In order to show the effectiveness of the inhibitors of this invention, oxygen bomb tests were conducted. The apparatus employed was a stainless steel bomb of the type used for determining the stability of gasoline. The procedure for the test is as follows: A 25 ml. sample of acrylonitrile is measured into the glass liner of the bomb. After placing the liner in the bomb and closing it tightly, oxygen is introduced to a pressure of 100 lbs. per square inch at room temperature. The bomb is flushed by venting and refilled with oxygen to 100 p. s. i. The body of the bomb is then immersed in a steam bath and pressure recorded over a period of four hours.

As the bomb becomes heated the pressure will rise gradually to about 140 lbs. per square inch. If the sample is unstable the pressure, after leveling off, will drop sharply then increase rapidly and the acrylonitrile will polymerize to a yellow solid. If no pressure drop is noted and no solid polymer is formed during a four hour period, the acrylonitrile is considered to be stable.

Tests were conducted on acrylonitrile free of inhibitor, on acrylonitrile having incorporated therein a known inhibitor, and on acrylonitrile containing an inhibitor according to this invention. The samples tested, when containing an inhibitor, were made up to the desired concentration of inhibitor by dissolving a weighed sample of inhibitor in the required amount of unstabilized acrylonitrile. Results of stability tests are given in the Table I.

*Table I*

| Inhibitor | Conc., p. p. m. | Time | Product |
|---|---|---|---|
| None | XX | 22 min. | Solidified. |
| α-naphthylamine | 10 | 2 hrs. 10 min. | Polymer formed. |
| Do. | 100 | 4 hrs. | No polymer. |
| 2,2'-methylene-bis-4-ethyl-6-t-butylphenol. | 10 | 4 hrs. | Do. |
| Do. | 100 | 4 hrs. | Do. |

Table I shows that acrylonitrile with no inhibitor rapidly polymerizes. For required polymerization stability using α-naphthylamine, 100 p. p. m. is necessary. At this concentration, however, serious discoloration of acrylonitrile occurs on standing. The 2,2'-methylenebis-4-ethyl-6-t-butylphenol inhibitor of this invention, however, effectively inhibited polymerization using either 10 or 100 p. p. m. with no visible discoloration being produced on extended standing.

I claim:

1. A method of inhibiting the polymerization of acrylonitrile without discoloration which comprises incorporating therein at least 0.5 part per million of at least one compound having the formula

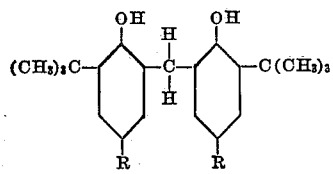

in which R is selected from the group consisting of methyl and ethyl.

2. A method according to claim 1 in which the amount is about 10 to 100 parts per million of acrylonitrile.

3. A method according to claim 1 in which R is methyl.

4. A method according to claim 1 in which R is ethyl.

5. A polymerization stabilized acrylonitrile containing as the polymerization inhibitor at least 0.5 part per million of at least one compound having the formula

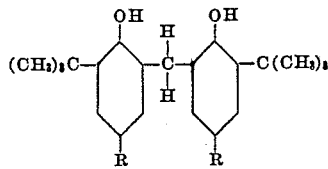

in which R is selected from the group consisting of methyl and ethyl.

6. A composition according to claim 5 in which the amount is about 10 to 100 parts per million of acrylonitrile.

7. A composition according to claim 5 in which R is methyl.

8. A composition according to claim 5 in which R is ethyl.

References Cited in the file of this patent

UNITED STATES PATENTS

| | | |
|---|---|---|
| 2,481,080 | Castner et al. | Sept. 6, 1949 |
| 2,538,355 | Davis et al. | Jan. 16, 1951 |
| 2,675,366 | Pullmann | Apr. 13, 1954 |
| 2,703,792 | Kropa et al. | Mar. 8, 1955 |